Aug. 28, 1951  R. WESTBURY  2,566,273
FLUID PRESSURE SERVOMOTOR
Filed Nov. 14, 1947  2 Sheets-Sheet 2
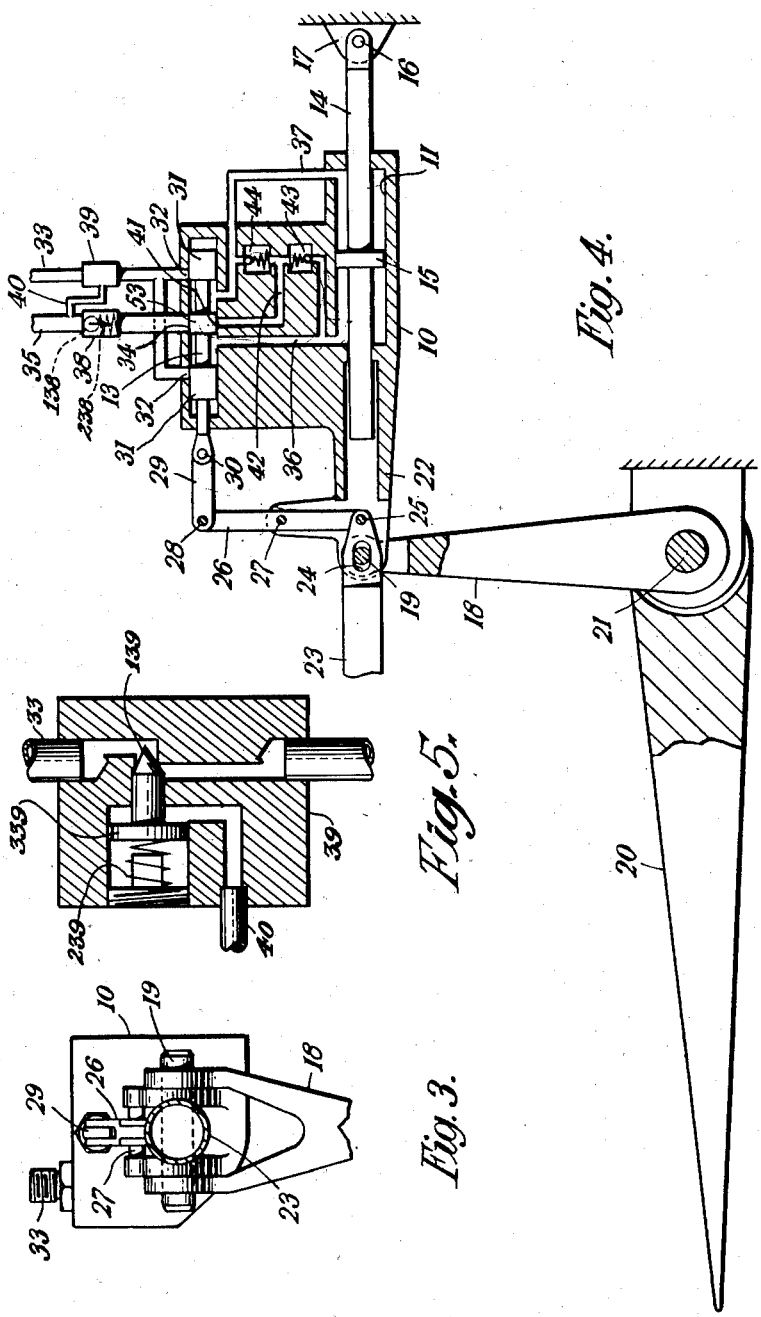

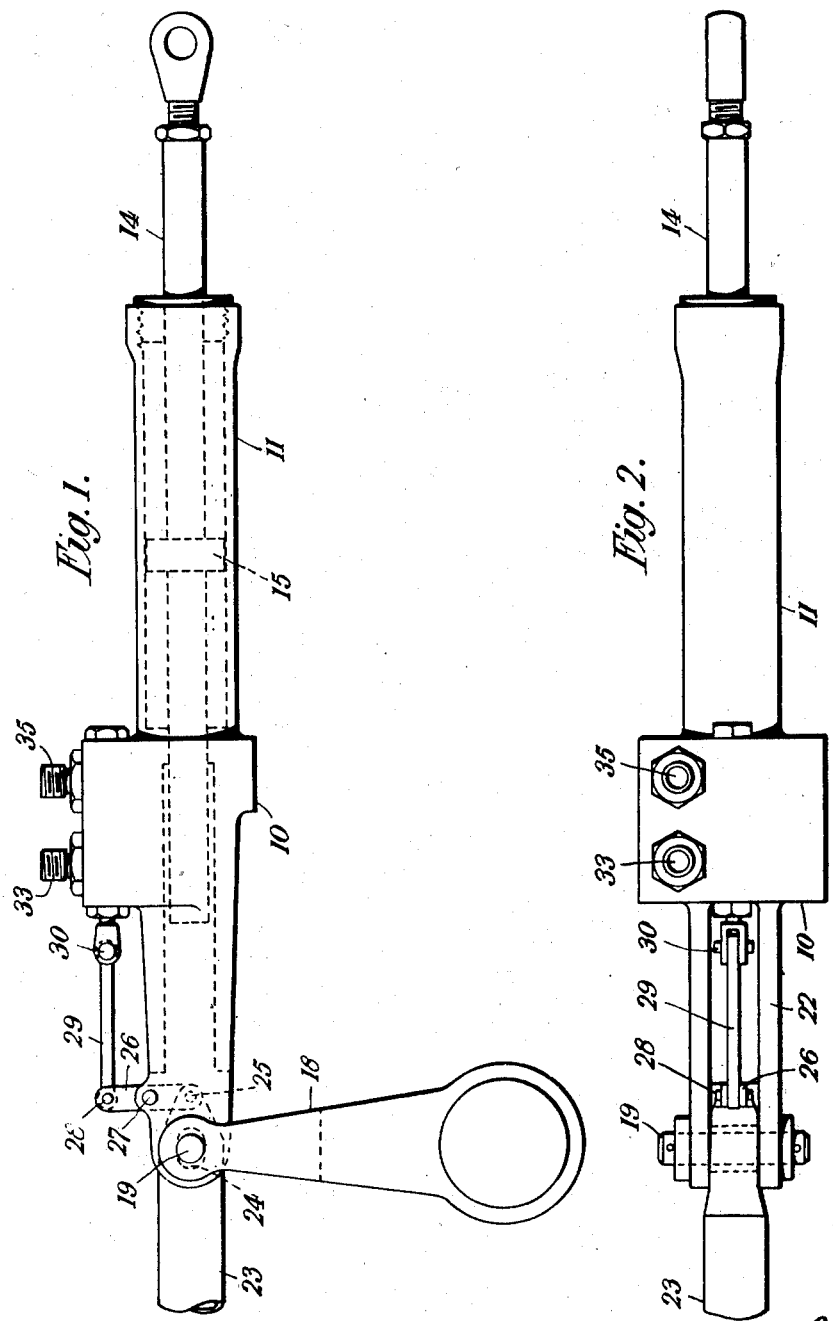

Patented Aug. 28, 1951

2,566,273

UNITED STATES PATENT OFFICE 2,566,273

FLUID PRESSURE SERVOMOTOR

Roy Westbury, Lapley, near Stafford, England, assignor to H. M. Hobson Limited, London, England, a company of Great Britain Application November 14, 1947, Serial No. 785,837
In Great Britain January 14, 1947

6 Claims. (Cl. 121—41)

1

This invention relates to hydraulic servomotors of the type comprising a servo member (e. g. a piston) mounted to move in an appropriately shaped housing (e. g. a cylinder), a control valve movable in opposite directions from a neutral position, in which it interrupts communication between the two ends of the housing, to connect opposite ends of the housing alternatively to a pressure inlet and to an exhaust outlet and thereby to effect relative movement in either of two directions of the servo member and housing, an operating member for imparting movement to the control valve, and a follow-up linkage for restoring the control valve to neutral position.

Such a servomotor is fully irreversible, so long as the hydraulic pressure does not fail, in that the operator does not feel any load controlled by the servomotor, and any load applied to the servomotor cannot cause movement of the control valve. This feature is of great importance where the servomotor is employed in aircraft for controlling the position of a control surface.

By providing a limited travel for the control valve, the operator is normally enabled, through the agency of the follow-up linkage, to operate the load manually, should the hydraulic power fail, by effecting movement of the servo member in relation to its housing, after taking up the backlash provided by the valve travel. The irreversibility of the system is then, however, lost, the operator merely having direct manual control over the load.

The object of this invention is to provide a servomotor of the above type which is irreversible even in the event of the hydraulic power failing, so that the servomotor can be manually operated under these conditions without the load applied to it being transmitted to the operating member.

The invention provides a hydraulic servomotor of the above type, comprising valves which are normally free to open to permit of operation of the servomotor under the control of the control valve, but which are arranged to close, in the event of failure of the hydraulic pressure, to trap liquid within the motor, and a valve system which permits of circulation of the trapped fluid, under conditions of pressure failure, in response only to movement imparted to the operating member, so as to allow of manual movement of the servo member in relation to its housing while preventing movement of the servo member in relation to its housing by the load applied to the servomotor.

The valves for trapping liquid within the motor

2 in the event of hydraulic pressure failure may comprise a non-return valve, at or adjacent the pressure inlet, which is arranged to close when the pressure fails, and a stop valve, at or adjacent the exhaust outlet, which is biassed to close but normally held open by the pressure in the pressure line.

The servo motor according to the invention is of particular application for the purpose of operating control surfaces of aircraft, for example the ailerons, elevator or rudder.

For this purpose it is extremely desirable that the servomotor should be completely irreversible. It is then possible to dispense with mass balancing of the control surfaces without introducing the danger of control flutter. In the case of very large aircraft the saving in weight due to this is considerable and, in the case of small very fast aircraft, flutter is effectively prevented, mass balancing not being a certain cure at high speeds.

It is necessary in such installations to consider the possibility of hydraulic power system failure, and since the servomotor is relied upon to eliminate control flutter, it is an advantage to have a form of servomotor which will remain irreversible under this condition.

One form of servomotor according to the invention arranged to operate an aircraft control surface will now be described in detail, by way of example, with reference to the accompanying drawings, in which:

Fig. 1 is a side elevation of the servomotor,

Fig. 2 is a corresponding plan view,

Fig. 3 is an end elevation looking from the left hand side of Fig. 2,

Fig. 4 is a diagrammatic sectional view through the servomotor, showing its connection to the control surface, and Fig. 5 is an enlarged sectional view through the stop valve.

Like reference characters designate like parts throughout the figures.

The servomotor comprises, see in particular Fig. 4, a servo cylinder unit 10, having in it a jack cylinder 11, a bore 12 for accommodating a piston type control valve 13 and certain passages which will be described later.

The piston rod 14 of the jack piston 15 projects at one end from the unit and this projecting end of the piston rod is pivoted at 16 on a fixed anchorage 17. At the end remote from the anchorage the cylinder unit 10 is pivoted, by a pin 19, to an arm 18 for actuating the control surface 20, this arm 18 turning on a fixed pivot 21 at its lower end, as the cylinder unit 10 moves in relation to the jack piston 15 and being fixed to the control surface 20.

The arm 18 is bifurcated (see Fig. 2), as also is an extension 22 of the servo cylinder unit 10 which carries the pivot pin 19. The servomotor is operated by longitudinal movement, from a manually operable control member in the cockpit, of an operating member 23. This member 23 has a slot 24, of greater length than the diameter of the pin 19, which passes through the slot as shown. The right hand end of the member 23 is pivoted at 25 (Fig. 1) to the lower end of a follow-up link 26. The link 26 is pivoted intermediately at 27 to the servo cylinder unit 10, and at its upper end 28 to a piston rod 29 connected, at 30, to the control valve 13.

The control valve 13 (see Fig. 4) is of the three land type, the outer lands 31, in the neutral position of the valve shown in Fig. 4, masking exhaust outlet ports 32 leading to a return line 33, and the middle land 53, in the neutral position, masking an inlet port 34 leading from a pressure line 35. The waisted portions of the valve between the lands are open to end passages 36, 37 leading to opposite ends of the jack cylinder 11.

Longitudinal movement of the operating member 23 effects, through the follow-up link 26, longitudinal movement of the control valve 13 in the opposite direction, the slot 24 in the operating member moving in relation to the pin 19. Movement of the control valve 13 from neutral position applies pressure to one end of the jack cylinder and connects the other end of the jack cylinder to the return line. The jack cylinder unit 10 therefore moves in relation to the fixed jack piston 15, adjusting arm 18 and control surface 20. The movement stops when the cylinder unit 10 has restored the control valve 13 to neutral position through the follow-up link 26 which swings, during its restoring movement, about its pivotal attachment 25 to the operating member 23.

In the pressure supply line 35 to the servomotor is placed a non-return valve 38, and in the return line is placed a stop valve 39, controlled by the supply pressure, applied thereto by conduit 40, in such manner that it is normally held open by the supply pressure, but will close should the pressure fail. These two valves operate in conjunction to seal the fluid within the servomotor upon pressure failure taking place. The piston rod 14 of the jack piston 15 is extended through both ends of the jack cylinder 11 and so allows transfer of fluid from one side of the jack piston to the other without change of volume.

The non-return valve 38 comprises a ball 138 loaded by a spring 238 so that the valve will close in the event of failure of the pressure in line 35. The stop valve 39 (Fig. 5) comprises a valve member 139 urged by a spring 239 into position to close the return line 33, as shown, and carrying a piston 339 exposed to the pressure in conduit 40, so that when pressure is available in line 35, this pressure, acting on piston 339, will overcome spring 239 and maintain the stop valve open. On failure of the pressure, the spring will close the stop valve as shown in Fig. 5.

The pin and slot connection 19, 24 between the operating member 23 and the arm 18 gives the pilot emergency direct manual control of the position of the arm 18, and therefore of the control surface 20, after taking up the backlash due to the slot 24. To enable such manual movement to be effected, provision is made as follows for the circulation of the trapped pressure fluid from one side of the jack piston 15 to the other.

An additional port 41 is provided for the control valve, this being normally sealed by the middle land 53, and only opened by movement of the valve in excess of normal movement, being smaller in diameter than the inlet port 34. This additional port 41 leads to a conduit 42 communicating, via non-return valves 43, 44 with the end passages 36, 37 connecting the waisted portions of the control valves with the ends of the jack cylinder. The non-return valves 43, 44 are oriented to prevent liquid from flowing from the port 41 to the end passages 36, 37.

Should the pilot make a control movement under conditions of pressure failure, he will initially take up the backlash in the slot 24 and, in so doing, move the valve 13 to open the additional port 41. Additional movement by the pilot will then move the cylinder unit 105 transferring liquid from one end of the jack cylinder 11 to the other through one or other of the non-return valves 43, 44 and the open additional port 41.

According to the direction of the motion of the operating member 23, the additional port 41 will be open to one or other of the waisted portions of the control valve 13 and one or other of the non-return valves 43, 44 will function to allow liquid to circulate from one side of the jack piston 15 to the other as the cylinder unit 10 is moved manually, by the operating member 23, through the agency of the pin-and-slot connection between the latter and the arm 18.

Movement of the cylinder unit 10 by the load imposed thereon by the control surface is, however, prevented as follows. Should the control surface 20 tend to move it in the direction opposite to that in which the pilot is tending to move it, one or other of the non-return valves 43, 44 will prevent such movement. Should the control surface 20 tend to move in the same direction as that initiated by the pilot, the control valve 13 will be restored, by the follow-up link 26, which then pivots about its lower end 25, to position to close the additional port 41. In either case therefore passage of fluid from one end of the jack cylinder 11 to the other is prevented. The jack is thus irreversible not only when supplied with hydraulic power but also when the power supply has failed.

The additional port 41 is made narrower than the inlet port 34 so that it will only just be opened when the backlash in the pin and slot connection 19, 24 has been taken up, and will close immediately if the load tends to move the cylinder unit 10 in the same direction as the operating member 23. Flutter of the control surface is thus effectively prevented during manual operation.

What I claim as my invention and desire to secure by Letters Patent is:

1. A hydraulic servomotor, comprising a servo member, a housing for said servo member, said servo member being movable relatively to said housing to actuate a load, a pair of end conduits for allowing liquid to flow to and from the parts of said housing on opposite sides of said servo member, pressure and return lines, an operating member, a control valve movable by the operating member from a neutral position, in which it closes both of said end conduits, to connect said conduits alternatively, and in accordance with the direction of movement of said control valve from neutral position, to the pressure and return lines and thereby to effect relative movement of said servo member and housing, said movement ceasing, due to reclosure of the end conduits by the control valve, when said servo member has moved to a position in the housing determined by the position of the operating member, valves for controlling the flow of liquid from the pressure line to the housing and thence to the return line, said valves being normally held open by the pressure in the pressure line but being arranged to close to trap liquid within the servomotor on failure of pressure in the pressure line, and a supplementary and normally closed valve-controlled connection between the parts of the housing on opposite sides of the servo member which may be opened, in the event of pressure failure, by movement of the operating member to allow of uni-directional circulation only of the trapped liquid within the servomotor, said supplementary connection including a conduit terminating in a port, normally closed by the control valve, and communicating with each of the end conduits by a non-return valve oriented to prevent liquid from flowing from the port to that end conduit, and said control valve being effective, when moved from neutral position by the operating member in the event of pressure failure, to connect said port directly to one or other of said end conduits according to the direction of movement of said control valve.

2. A hydraulic servomotor, comprising a fixed servo piston, a servo cylinder enclosing said servo piston and movable relatively thereto to actuate a load, a pair of end conduits for allowing liquid to flow to and from the ends of the servo cylinder, pressure and return lines, an operating member, a control valve movable by the operating member from a neutral position, in which it closes both of said end conduits, to connect said end conduits alternatively, and in accordance with the direction of movement of said control valve from neutral position, to the pressure and return lines and thereby to effect movement of the servo cylinder in relation to the servo piston, a followup link pivoted at its ends to the operating member and to the control valve respectively and pivoted intermediately to the servo cylinder, a member pivoted to the servo cylinder and operable thereby to actuate the load, a pin and slot connection between said operating member and said pivoted member, valves for controlling the flow of liquid from the pressure line to the servo cylinder and thence to the return lines, said valves being normally held open by the pressure in the pressure line but being arranged to close to trap liquid within the servomotor on failure of pressure in the pressure line, and a supplementary connection between opposite ends of the servo cylinder including a conduit terminating in a port, normally closed by the control valve, and communicating with each of the end conduits by a non-return valve oriented to prevent liquid from flowing from the port to that end conduit, said control valve being effective, when moved from neutral position by movement of the operating member in either direction sufficient to take up lost motion in said pin and slot connection, to connect said port directly to one or other of said end conduits, according to the direction of movement of said control valve.

3. A hydraulic servomotor, comprising a fixed servo piston, a servo cylinder enclosing said servo piston and movable relatively thereto to actuate a load, a pair of end conduits for allowing liquid to flow to and from the ends of the servo cylinder, pressure and return lines, an operating member, a control valve movable by the operating member from a neutral position, in which it closes both of said end conduits, to connect said end conduits alternatively, and in accordance with the direction of movement of said control valve from neutral position, to the pressure and return lines and thereby to effect movement of the servo cylinder in relation to the servo piston, said control valve having three lands separated by waisted portions serving normally, on movement of the control valve from neutral position, to establish said alternative connections between said end conduits and the pressure and return lines, a follow-up link pivoted at its ends to the operating member and to the control valve respectively and pivoted intermediately to the servo cylinder, a member pivoted to the servo cylinder and operable thereby to actuate the load, a pin and slot connection between said operating member and said pivoted member, valves for controlling the flow of liquid from the pressure line to the servo cylinder and thence to the return line, said valves being normally held open by the pressure in the pressure line but being arranged to close to trap liquid within the servomotor on failure of pressure in the pressure line, and a supplementary connection between opposite ends of the servo cylinder including a conduit terminating in a port normally closed by the central land of the control valve and communicating with each of the end conduits by a non-return valve oriented to prevent liquid from flowing from the port to that end conduit, the central land of the control valve being effective, when the control valve is moved from neutral position by movement of the operating member in either direction sufficient to take up lost motion in said pin and slot connection, to connect said port via one of the waisted portions of the control valve directly to one or other of said end conduits according to the direction of movement of said control valve.

4. A hydraulic servomotor comprising a manually operable input member, an output member, a servo member, a housing for said servo member, said servo member being movable in relation to said housing to actuate the output member, a pressure line, a return line, a control valve normally occupying a neutral position in which it prevents communication between said housing and said pressure and return lines, and thereby locks said servo member against movement in relation to its housing under load applied to said output member, said input member being movable to displace said control valve over a normal range of movement from neutral position to connect the ends of said housing one to the pressure line and the other to the return line and thereby, by effecting relative movement between said servo member and said housing, to move said output member in a direction and to an extent determined by the movement imparted to said input member, movement of said output member being terminated by return of said control valve to neutral position and said input member being movable, under conditions of pressure failure, to displace said control valve in either direction beyond its normal range of movement and being then operative to impart manual adjustment to said output member, valves for controlling the flow of liquid from the pressure line to the housing and thence to the return line, said valves being normally held open by the pressure in the pressure line but being arranged to close to trap liquid within the servomotor on failure of pressure in the pressure line, a normally closed supplementary connection between the ends of the housing, said connection being arranged to open, in the event of pressure failure, on movement of said input member to displace said control valve beyond its normal range of movement, to allow liquid to circulate through said connection, in one direction or the other according to the direction of movement of said input member and thereby to allow manual operation of the output member by the input member, and to close if the output member overruns said input member, and valves associated with said supplementary connection for preventing circulation of liquid therein in the reverse direction and thereby preventing movement of the output member in the direction reverse to that selected by the input member.

5. A hydraulic servomotor, comprising a fixed servo piston, a servo cylinder enclosing said servo piston and movable relatively thereto to actuate a load, a pair of end conduits for allowing liquid to flow to and from the ends of the servo cylinder, pressure and return lines, an operating member, a control valve movable by the operating member from a neutral position, in which it closes both of said end conduits, to connect said end conduits alternatively, and in accordance with the direction of movement of said control valve from neutral position, to the pressure and return lines and thereby to effect movement of the servo cylinder in relation to the servo piston, a follow-up link pivoted at its ends to the operating member and to the control valve respectively and pivoted intermediately to the servo cylinder, a member pivoted to the servo cylinder and operable thereby to actuate the load, a pin and slot connection between said operating member and said pivoted member, valves for controlling the flow of liquid from the pressure line to the servo cylinder and thence to the return line, said valves being normally held open by the pressure in the pressure line but being arranged to close to trap liquid within the servomotor on failure of pressure in the pressure line, a normally closed supplementary connection between opposite ends of the servo cylinder which may be opened, in the event of pressure failure, by movement of said input member in either direction to take up the lost motion in said pin and slot connection, to allow of flow of trapped liquid from one end of the cylinder to the other to permit of manual operation of said pivoted member by said operating member, said follow-up link being effective to close said supplementary connection in the event of said pivoted member moving to a position beyond that determined by the movement imparted to said input member, and valve mechanism associated with said supplementary connection for preventing circulation of trapped liquid therethrough in the direction allowing of movement of said pivoted member in the direction reverse to that selected by said input member.

6. A hydraulic servomotor comprising a manually operable input member, an output member, a servo member, a housing for said servo member, said servo member being movable in relation to said housing to actuate the output member, a pressure line, a return line, said input member being operable to connect one end of said housing to the pressure line and the other end of said housing to the return line and thereby, by effecting relative movement between said servo member and said housing, to move said output member in a direction and to an extent determined by the movement imparted to the input member and said input member being also operable, in the case of pressure failure, to actuate said output member manually, valves for controlling the flow of liquid from the pressure line to the housing and thence to the return line, said valves being normally held open by the pressure in the pressure line but being arranged to close to trap liquid within the servomotor on failure of pressure in the pressure line, a control valve linked to the input member, and a normally closed valve-controlled connection between opposite ends of the housing, which may be opened, in the event of pressure failure, by movement of the input member to allow of uni-directional circulation only of the trapped liquid within the servomotor, said supplementary connection including a conduit terminating in a port, normally closed by the control valve, and communicating with each end of the housing by a non-return valve oriented to prevent liquid from flowing from the port to that end of the housing, said control valve being movable from normal position by the input member in the event of pressure failure to connect said port directly to one or other end of said housing according to the direction of movement of said control valve.

ROY WESTBURY.

REFERENCES CITED

The following references are of record in the file of this patent:

UNITED STATES PATENTS

| Number | Name | Date |
|---|---|---|
| 2,366,382 | Burton | Jan. 2, 1945 |
| 2,383,773 | Chisholm | Aug. 28, 1945 |
| 2,395,671 | Kleinhans | Feb. 26, 1946 |
| 2,403,325 | Armington | July 2, 1946 |
| 2,503,956 | Lisle | Apr. 11, 1950 |